W. A. KELSEY.
DENTAL TOOL.
APPLICATION FILED MAY 10, 1918.
1,385,747.
Patented July 26, 1921.
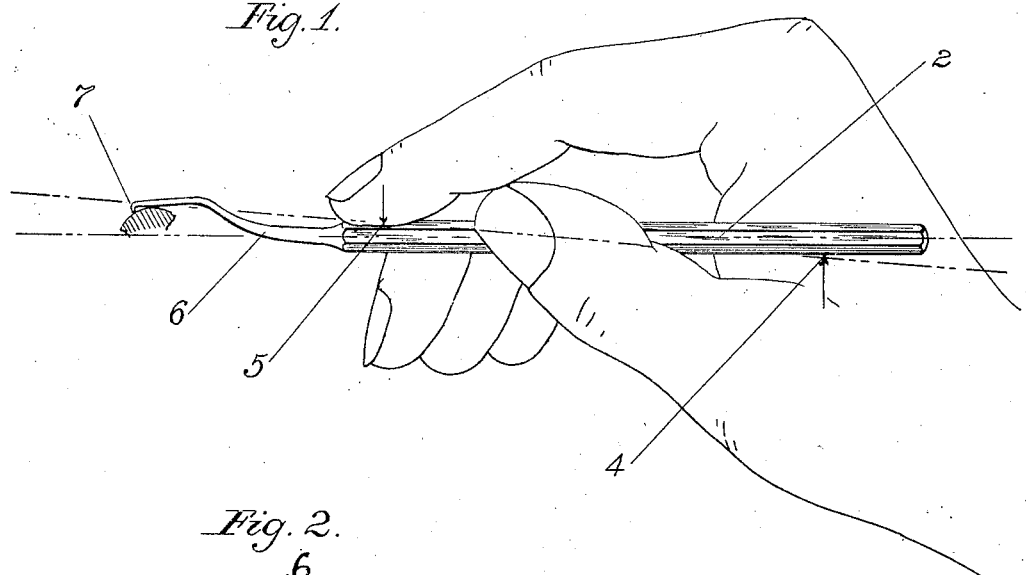
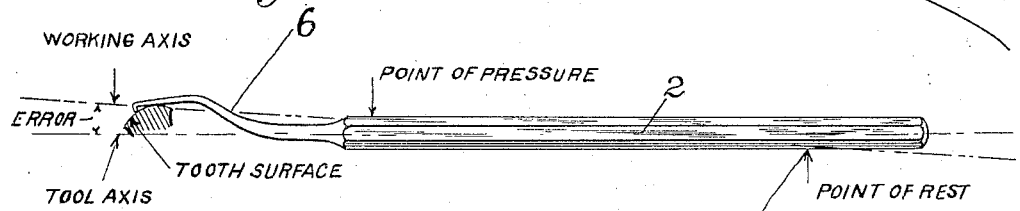
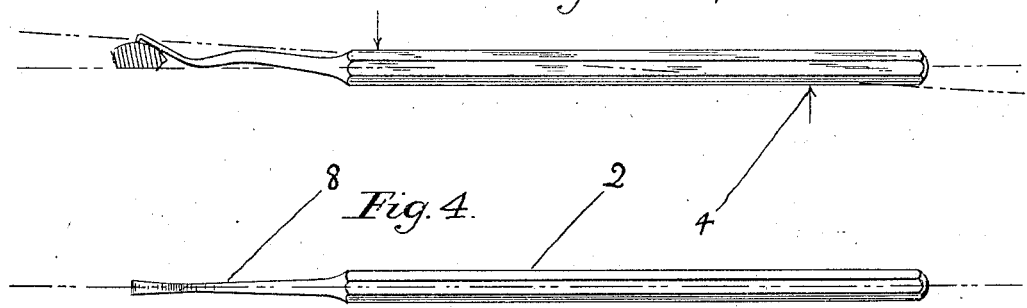
Witnesses
M. R. DeLeghne
C. H. Rehfuss
Inventor
WILLIAM A KELSEY
By his Attorneys
Paul & Paul

UNITED STATES PATENT OFFICE.

WILLIAM A. KELSEY, OF MINNEAPOLIS, MINNESOTA.

DENTAL TOOL.

1,385,747.	Specification of Letters Patent.	Patented July 26, 1921.

Application filed May 10, 1918. Serial No. 233,627.

*To all whom it may concern:*

Be it known that I, WILLIAM A. KELSEY, a citizen of the United States, resident of Minneapolis, county of Hennepin, State of Minnesota, have invented certain new and useful Improvements in Dental Tools, of which the following is a specification.

In the manufacture of dental tools, no particular attention has heretofore been paid to the position of the cutting edge of the tool with respect to the points of rest and pressure in the hand. The tools are made with shanks of various shapes and sizes and angles with respect to the axis of the hand grip for the purpose of reaching different parts of the tooth and applying the cutting edge of the tool to the surface on which the work is being performed. In pyorrhea work, where the instrument is thrust down to the roots of the tooth for the purpose of cleaning the surface thereof, the operator cannot see the cutting edge and cannot tell exactly the position of said edge with respect to the surface on which he is working. This is also true in using tools as ordinarily made on other parts of the teeth, the tools being usually made with varying positions of the cutting edges and without any relation whatever to the points of rest of the tool shank in the hand or the point of pressure of the fingers thereon. The object, therefore, of my invention is to provide a dental tool with the shank cutting edge and hand grip in such relation that the cutting edge will automatically square or seat itself on the tooth surface without any adjustment or effort on the part of the operator and no matter whether the tooth surface and the cutting edge are visible to the operator or not.

The invention consists generally in a dental tool constructed as hereinafter specified and pointed out in the claims.

In the accompanying drawings forming part of this specification,

Figure 1 is a view illustrating my improved tool in use, showing the position of the hand of the operator thereon, Fig. 2 is a similar view of the tool, with the hand removed, indicating the working axis and the axis of the tool itself, Fig. 3 illustrates a tool with the modified form of shank, Fig. 4 is a top view of the tool showing the point of intersection of the line drawn from the point of rest and point of pressure with the cutting edge of the tool.

In the drawing, 2 represents the hand grip portion of the tool. 4 is the point of rest of the hand grip in the operator's hand and 5 is the point of pressure of the operator's finger on the top of the grip. The point or pressure 5 is on one surface of the hand grip portion of the tool and toward the shank end thereof, while the point of rest 4 is on the opposite surface of said portion and toward the other end thereof. 6 is a shank formed at an angle to the axis of the hand grip, as usual in tools of this kind and terminating in a cutting edge 7 which extends transversely to the shank and is turned at an angle to the axis of the shank, as usual in tools of this type.

In carrying out my invention, I form this shank and the cutting edge so that a straight line drawn through the point of rest and the point of pressure will intersect the cutting edge of the tool through the middle thereof, as indicated in Fig. 4. I have found that when this is done and the operator takes the tool in his hand and planes it on the tooth surface and applies pressure at the point 5 thereto, the tool, if not squarely seated on the surface will automatically rotate in the operator's hand until the cutting edge is squarely seated on the work and this will happen regardless of whether the surface and the cutting edge are visible to the operator or not. After exhaustive experiments, I have found that this result or action of the cutting edge is due to the position of the cutting edge with respect to the points of pressure and rest of the hand on the tool. If these three points are not in line so that a straight line will intersect them, then the result I have described cannot be obtained and the instrument will be defective to the extent that the operator cannot, unless the tooth surface and cutting edge are visible, accurately determine whether the cutting edge is square on the tooth surface or not. With my invention it makes no difference whether the tool when first inserted into the work is square with the surface or not; if not, it will automatically rotate and seat itself without any effort on the part of the user of the tool and this will be true regardless of the shape of the shank or the distance of the cutting edge from the hand grip as long as a straight line drawn through the points of rest and pressure intersect the middle portion of the cutting edge.

In Figs. 3 and 4 I have shown a tool with a shank 8 of different form from the one shown in Figs. 1 and 2 with a cutting edge at a different angle to the shank, but the principle involved is the same in both instances, a straight line drawn through the points of rest and pressure intersecting the cutting edge. This same idea may be carried through an entire line of dental tools and ease of manipulation and accuracy of work insured.

The offset of the cutting blade, which terminates the shank, is directly proportioned to the diameter of the handle or handgrip, so that whatever the diameter of said handle or hand-grip a straight line from the cutting edge through the surface of the handle at the point of pressure thereon will, if extended, pass through the opposite surface of the handle near its other end or at the point of rest. If, therefore, a handle or hand-grip of greater diameter is employed, there must be a corresponding increase in the offset of the shank and the cutting edge at the end of the shank.

I claim as my invention:

1. A dental tool comprising, in combination, a handle or hand-grip portion and an offset shank projecting from one end thereof, said shank being provided with a cutting edge positioned with respect to the shank and the handle so that a straight line extending from the cutting edge through the outer surface of the handle near its shank end will extend through the opposite side of said handle near its other end.

2. A dental tool comprising, in combination, a handle or hand-grip portion and an offset shank projecting from one end thereof, said shank being provided with a cutting edge positioned with respect to the shank so that a straight line extending through the points of rest and pressure for the hand of the operator on the handle will intersect said cutting edge.

3. A dental tool comprising, in combination, a handle or hand-grip portion and an offset shank projecting from one end thereof, said shank terminating in a cutting edge, said cutting edge and the points of pressure and rest on opposite sides of said hand-grip near the ends thereof being in alinement with each other.

In witness whereof, I have hereunto set my hand this 26th day of April, 1918.

WILLIAM A. KELSEY.